May 20, 1969     I. B. LUECK     3,445,169
NEUTRALIZER LENS FOR LENS TESTING INSTRUMENT
Filed Dec. 14, 1964
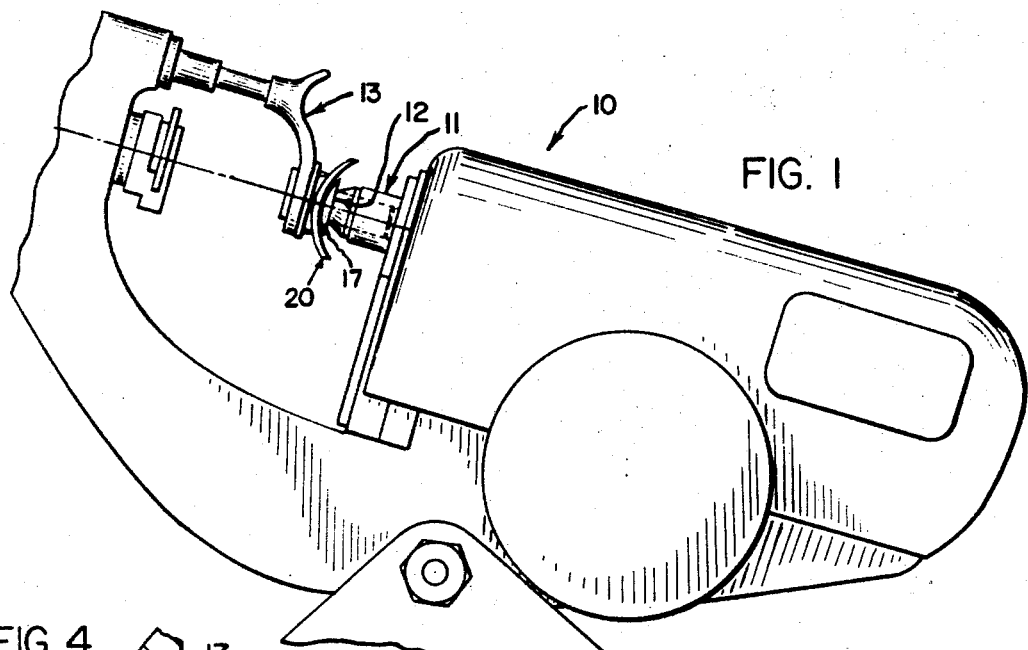
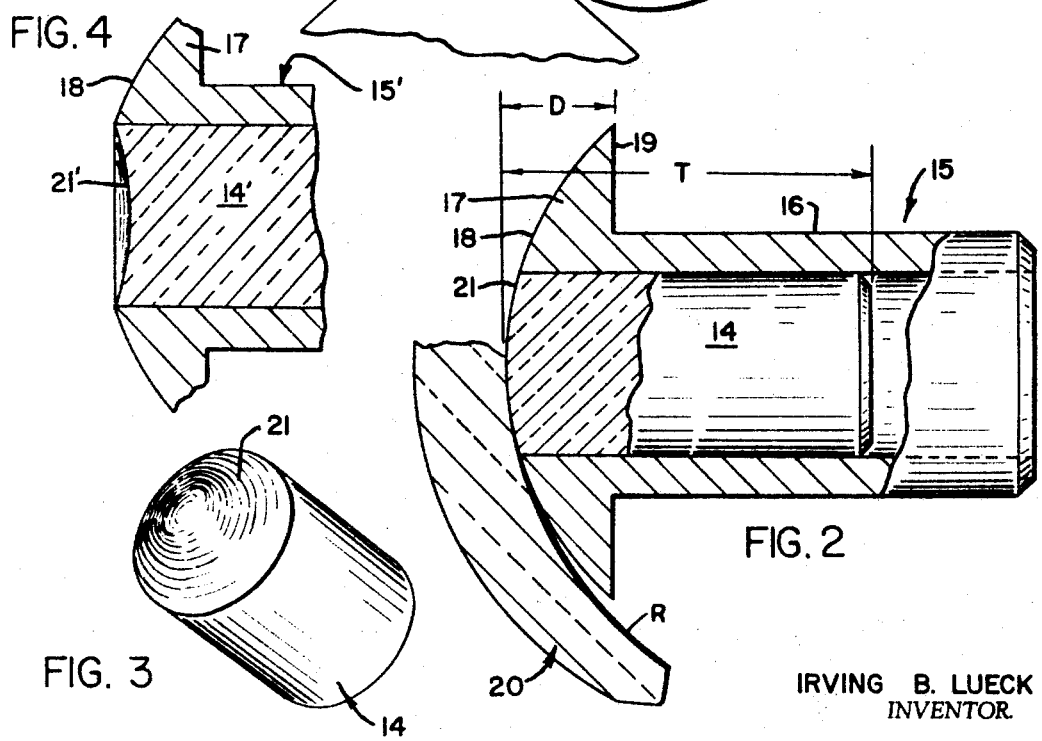
IRVING B. LUECK
INVENTOR.
BY *Frank C. Parker*
ATTORNEY

United States Patent Office 3,445,169
Patented May 20, 1969

3,445,169
NEUTRALIZER LENS FOR LENS TESTING INSTRUMENT
Irving B. Lueck, East Rochester, N.Y., assignor to Bausch & Lomb Incorporated, Rochester, N.Y., a corporation of New York
Filed Dec. 14, 1964, Ser. No. 418,074
Int. Cl. G01b *9/00;* G02b *3/00, 9/00*
U.S. Cl. 356—124                2 Claims

ABSTRACT OF THE DISCLOSURE

An ancillary lens which is demountably held in the conical stop of a vertometer and is so constructed as to extend the measuring range of the instrument by displacing the target zero position.

---

The present invention relates to a lens testing instrument and more particularly it relates to means for extending the range of diopter measurement thereof to high diopter ophthalmic lenses.

Conventional lens testing instruments for ophthalmic lenses, such as shown in U.S. Patent No. 2,723,594 issued Nov. 15, 1955, to I. B. Lueck, are usually limited in their operating range to lenses of substantially 20 diopters maximum. There are, however, many ophthalmic prescriptions requiring more than 20 diopters of lens power in either positive or negative power and the need for such lenses is steadily rising in more recent times.

In view of the foregoing, it is an object of the present invention to provide an auxiliary lens of known power and having a sign opposite to the lens to be tested, said lens being so constructed and arranged as to neutralize the lens power of the lens to be tested by the amount of said known power.

It is a further object of the present invention to provide a demountable adapter for the neutralizing lens which can be inserted into the instrument without modification thereof, and in a correct manner unfailingly.

A still further object is to provide such a device which is ultimately simple and sturdy but does not degrade the usual performance standards of the instrument.

Further objects and advantages will be found in the constructional details and arrangement of the present invention by reference to the following specification taken in connection with the accompanying drawing, wherein:

FIG. 1 is a general view in side elevation showing a lens testing instrument partly broken away and including a preferred form of the present invention;

FIG. 2 is a side elevation much enlarged and partly broken away and shown in section of one form of the present invention in association with a lens to be tested;

FIG. 3 is an enlarged perspective view of a lens shown in FIG. 2; and

FIG. 4 is a partial view similar to FIG. 2 of a second form of the invention.

The central problem which the present invention solves is the measurement of the dioptric power of so-called high minus or high plus ophthalmic lenses, such a classification including those lenses rated at more than substantially 20 diopters.

As shown in FIG. 1 of the drawing, the numeral 10 generally represents the aforesaid lens testing instrument having the usual bored conical stop 11 fixed therein. On the front end of said stop 11 is an annular or rim-like portion 12 against which a lens to be tested is normally held, said lens being held thereon by a spring-pressed holding finger 13. In this conventional form of lens support, the power of ophthalmic lenses of more than 20 diopters cannot be measured since the normal measuring capacity in either negative or positive power is about 20 diopters.

According to the present invention, a neutralizing and compensating lens 14 is provided having at least half of the power of the high diopter ophthalmic lens, the value preferably being 20 diopters of power of the opposite sign to that of said high diopter lens 20 to be tested, so that a large portion of the refracting power of the lens to be tested is neutralized. This means that one neutralizing lens 14 of convex curvature and another lens of concave curvature are provided for the neutralizing function. The advantage of this invention is that the lens testing machine 10 after the addition of the neutralizing lens 14 is capable of measuring high diopter lenses designated by numeral 20 without any change in its standard lens system or associated readout system.

Each of the aforesaid neutralizing lenses is supported by and secured within an adapter 15 having a cylindrical tubular body 16 whereon is formed a mushroom-like spherical head 17 on which the rear surface of a lens 20 to be tested is held. On the head 17, a front spherical surface 18 is formed having a radius not larger than the smallest radius R of the back surface of a lens 20 to be tested. Surface 18 terminates peripherally in a radial surface 19 which forms the rear of the head 17 and joins the cylindrical body 16. The axial thickness of the head is designated D.

The cylindrical body 16 of the adapter 15 is slidably and demountably fitted within the bore of the aforesaid conical stop 11 and the adapter is axially positioned therein by the abutment of the radial surface 19 against the front edge 12 of said conical stop 11 as shown in FIG. 1.

As best shown in FIG. 2, the central part at least of the rear surface of lens 20 contacts the front surface 21 of the neutralizing lens 14 while in operative position. As aforesaid, the front surface 21 is located at a distance D ahead of the usual location of the lens supporting surface 12. The error produced in the readout system by moving the lens 20 ahead by the distance D is compensated optically by proportioning the axial thicknesss T of the lens 14 in accordance with the formula herebelow, $$T = \frac{Dn}{n-1}$$

wherein $n$ represents the refractive index of the glass in said lens. It is evident from the formula that the length dimension T depends partly on the kind of glass used in lens 14 but preferably the refractive index of the glass should be close to 1.524 and have low dispersion.

As mentioned in the foregoing description, in order to accommodate the entire scope of ophthalmic lenses to be tested, it is necessary to provide a neutralizing lens 14′ shown in FIG. 4 having a concave refractive surface 21′. The periphery of the concave surface 21′ is located coincidently with the edge of spherical surface 18 on the adapter 15′. The radius of surface 21′ is specified as being preferably 20 diopters.

With regard to the use of the invention in a standard lens testing instrument 10, either the adapter 15 or adapter 15′ may be inserted in the conical stop 11 by withdrawing the holding finger 13 and inserting the adapter in the bore of the stop 11. Without further modification, the instrument 10 is ready for use, and in noting the value indicated by the readout means, the dioptric rating of the neutralizing lens 14 or 14′ is added.

The power of the neutralizer lenses 14 or 14′ is chosen either as +20 power or −20 power so that any currently used manufacturer's tolerance in the lens 14 or 14′ can be accommodated when the neutralizer lens is inserted in the conical stop 11 and the readout mechanism is set for use. If the power of the neutralizer lens 14 or 14' is exactly right, the +20D adapter will "zero in" at +20D on the instrument scale and likewise the —20D adapter will "zero in" at —20D on said scale. Logically then, a manufacturer's tolerance of ±0.50D means that the instrument will "zero in" at 20D±0.50D and this quantity becomes the new benchmark from which the remaining lens power is read. Ordinarily, the difference between the sag of a 20D curve on lens 14' and the sag of the curve on the lens to be tested is small enough to be disregarded and this fact is due partly to the comparatively small diameter lens 14 or 14'.

Although only certain forms of the present invention have been shown and described in detail, other forms are possible while achieving the advantageous features of simplicity, accuracy and low cost, and changes may be made in the arrangement and details of construction without departing from the spirit of the invention as defined in the claims here appended.

I claim:

1. A compensated neutralizer lens and mount therefor used as an auxiliary lens in a vertometer for extending the measuring range thereof to high diopter ophthalmic lenses, said neutralizer lens and mount comprising:

a front spherical refracting surface whereon the rear surfaces of the lenses to be tested are individually held, the lenses being in surface contact at the central portions thereof, the power of the neutralizer lens being opposite in sign to the power of the high diopter ophthalmic lens and being substantially 20 diopters, said neutralizer lens being held in the usual conical stop of the vertometer by a mounting characterized by a cylindrical body whereon a spherical head is formed, the radius thereof being substantially the same as the radius of said front refracting surface and being substantially continuous therewith, an extended cylindrical surface being formed on said mounting, and a substantially radial surface being formed on the rear of said head and terminating at said cylindrical surface, said radial surface being located at an axial distance D after said spherical surface and being held against the front edge of said conical stop, thereby advancing said front refracting surface by an axial distance D, and the axial thickness T of said neutralizer lens having a value as given in the mathematical expression herebelow which optically compensates for the axial distance D, $$T = \frac{Dn}{n-1}$$

where $n$ represents the refractive index of the glass in said lens.

2. A compensated neutralizer lens according to claim 1 wherein said index of refraction is substantially 1.524.

References Cited

UNITED STATES PATENTS

| | | | |
|---|---|---|---|
| 1,241,612 | 10/1917 | Emerson | 88—56 |
| 1,474,803 | 11/1923 | Tillyer | 88—56 |
| 2,723,594 | 11/1955 | Lueck | 88—56 |
| 3,332,320 | 7/1967 | Lueck | 88—56 |

RONALD L. WIBERT, *Primary Examiner.*

J. ROTHENBERG, JR., *Assistant Examiner.*

U.S. Cl. X.R.

350—175, 252, 257; 356—125